(12) United States Patent
Nguyen (10) Patent No.: US 6,947,758 B2
(45) Date of Patent: Sep. 20, 2005

(54) SYSTEM AND METHOD FOR PROVIDING A DISTRIBUTED PROCESSING ELEMENT UNIT IN A MOBILE TELECOMMUNICATIONS NETWORK

(75) Inventor: Nhut Nguyen, Richardson, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 449 days.

(21) Appl. No.: 10/008,723

(22) Filed: Dec. 5, 2001

(65) Prior Publication Data

US 2003/0104828 A1 Jun. 5, 2003

(51) Int. Cl.⁷ .............................. H04Q 7/20; H04M 1/00; H04J 3/24
(52) U.S. Cl. ................... 455/466; 455/432.1; 455/433; 455/560; 370/312
(58) Field of Search ......................... 455/432.1, 432.2, 455/412.1, 422.1, 424–425, 550.1, 466, 433–434, 435.1–435.3, 436, 439, 440–442, 453, 555, 556.1, 560–561; 370/312–313, 328

(56) References Cited

U.S. PATENT DOCUMENTS

| | | | | |
|---|---|---|---|---|
| 5,878,397 A | * | 3/1999 | Stille et al. | 455/466 |
| 6,018,660 A | * | 1/2000 | Alperovich et al. | 455/433 |
| 6,058,311 A | * | 5/2000 | Tsukagoshi | 455/435.1 |
| 6,091,953 A | * | 7/2000 | Ho et al. | 455/433 |
| 6,104,929 A | * | 8/2000 | Josse et al. | 455/445 |
| 6,148,201 A | * | 11/2000 | Ernam et al. | 455/433 |
| 6,324,402 B1 | * | 11/2001 | Waugh et al. | 455/445 |
| 6,330,445 B1 | * | 12/2001 | Skog et al. | 455/433 |
| 6,526,026 B1 | * | 2/2003 | Menon | 455/422.1 |
| 6,553,227 B1 | * | 4/2003 | Ho et al. | 455/433 |
| 6,580,906 B2 | * | 6/2003 | Bilgic et al. | 455/422.1 |
| 6,643,511 B1 | * | 11/2003 | Rune et al. | 455/433 |
| 6,810,250 B2 | * | 10/2004 | Jo et al. | 455/433 |

FOREIGN PATENT DOCUMENTS

| | | |
|---|---|---|
| GB | 2 246 269 | 1/1992 |
| JP | 2000138960 | 5/2000 |
| WO | WO 96/11557 | 4/1996 |
| WO | WO 97/07644 | 2/1997 |

* cited by examiner

*Primary Examiner*—William Trost
*Assistant Examiner*—Meless Zewdu (57) ABSTRACT

For use in a mobile telecommunications network comprising a mobile switching center, a plurality of subscribers, and a plurality of processing elements within a processing element unit, a system and method is disclosed for providing a distributed processing element unit that is capable of quickly and efficiently accessing each processing element by using a temporary subscriber identification number that contains embedded address information for the processing element. Subscriber records and application software programs are located within the processing elements to avoid having to send message traffic over the network requesting such information and to avoid the use of a centralized database server. In one advantageous embodiment of the invention, the processing element unit is a visitor location register.

21 Claims, 7 Drawing Sheets

SYSTEM AND METHOD FOR PROVIDING A DISTRIBUTED PROCESSING ELEMENT UNIT IN A MOBILE TELECOMMUNICATIONS NETWORK

TECHNICAL FIELD OF THE INVENTION

The present invention is directed, in general, to mobile telecommunications networks and, more specifically, to a system and method for providing a distributed processing element unit in a mobile telecommunications network.

BACKGROUND OF THE INVENTION

There are presently over 300 million customers worldwide for cellular telephones and other wireless devices. A significant percentage of these wireless devices are being used as a "data pipe" (i.e., voice traffic is not the primary function). Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber device (or wireless device) and another party through the wireless network. A smaller number of wireless devices are data devices, such as personal digital assistants (PDAs) equipped with cellular/wireless modems. Because the bandwidth for a current generation wireless device is typically limited to a few tens of kilobits per second (Kbps), the applications for the current generation of wireless devices are relatively limited. However, this is expected to change in the next (or third) generation of cellular/wireless technology, sometimes referred to as "3G" wireless/cellular, where much greater bandwidth will be available to each wireless device (i.e., 125 Kbps or greater). The higher data rates will make Internet applications for wireless devices much more common. For instance, a 3G cell phone (or a PC with a 3G cellular modem) may be used to browse web sites on the Internet, to transmit and receive graphics, to execute streaming audio or video applications, and the like. A much higher percentage of the wireless traffic handled by 3G cellular systems will be Internet protocol (IP) traffic and a lesser percentage will be traditional voice traffic.

Real-time streaming of multimedia content over Internet protocol (IP) networks has become an increasingly common application in recent years. As noted above, 3G wireless networks will provide streaming data (both video and audio) to wireless devices for real time applications. A wide range of interactive and non-interactive multimedia Internet applications, such as news on-demand, live TV viewing, video conferencing, live radio broadcasting (such as Broadcast.com), and the like, will provide "real time" data streaming to wireless devices. Unlike a "downloaded" video file, which may be retrieved first in "non-real" time and viewed or played back later, real time (or streaming) data applications require a data source to encode and to transmit a streaming data signal over a network to a receiver, which must decode and play the signal (video or audio) in real time.

As is well known in the art, when a user makes a call from a mobile station (e.g., a cell phone), the call is routed to a mobile switching center (MSC) for registration. The mobile switching center (MSC) is coupled to a visitor location register (VLR) The MSC is capable of sending information to and receiving information from the visitor location register (VLR). The VLR is capable of receiving registration messages that are sent from a mobile station to the MSC. The VLR registers each mobile station with its assigned home location register (HLR). A VLR is also capable of storing temporary copies of service profiles for each registered user and for each mobile station. A VLR is also capable of accessing the MSC to obtain a temporary routing number during an incoming call.

In a distributed architecture, a network element such as a MSC may comprise a plurality of processing elements (PEs). Each processing element (PE) shares the workload of the network element of which it is a part. A distributed architecture has many advantages including scalability and flexibility. However, when a network processing element (PE) needs to access subscriber data within a database such as the VLR, it is important that the PE be able to access the subscriber data quickly and efficiently. The problem is then how to organize the database for maximum efficiency.

One approach is to provide a centralized database that is shared by all of the processing elements (PEs). This simple arrangement presents significant problems. First, the centralized database server will be a potential bottleneck in the system. The capability of the database server may not be sufficient to keep up with the demands placed upon it. Second, there may be performance issues in that the access time for the centralized database server may be too slow for real time applications. Third, there may be memory constraints on the centralized database server. There may be a limit on the number of subscribers that the centralized database server can hold. Lastly, the cost associated with a centralized database server may be significant.

Another approach is to partition the database and distribute the data among the processing elements. This approach eliminates the problems mentioned above that appear when a centralized database server is used. However, this approach presents another challenging problem. Specifically, how is the database to be partitioned so that the processing elements can access subscriber data quickly and efficiently?

Suppose that the database is partitioned and distributed among the processing elements in a network element. One simple approach would be to arbitrarily assign a portion of the database to a processing element. Then when an application in a first processing element of the network element needs to access a subscriber record, the first processing element would send a request to other processing elements in the network element. The processing element that contains the subscriber record would send the requested subscriber record to the first processing element that issued the request.

This solution is simple but has significant drawbacks in that it may generate excessive message traffic sending requests and replies between the processing elements. This approach also has another drawback in the latency required to access the data in the database.

There is therefore a need in the art for an improved mobile telecommunications network architecture that is capable of distributing and accessing subscriber records quickly and efficiently. In particular, there is a need for an improved system and method for eliminating the need for requesting and sending subscriber records between processing elements in a network element in a mobile telecommunications network.

SUMMARY OF THE INVENTION

It is a primary object of the present invention to provide an improved apparatus and method for distributing and accessing subscriber records quickly and efficiently within a mobile telecommunications network.

The present invention is intended for use in a mobile telecommunications network of the type comprising a mobile switching center, a plurality of subscribers, and a plurality of processing elements within a processing element unit. The present invention provides a distributed processing element unit that is capable of providing quick and efficient access to information contained in each processing element within the processing element unit by using a temporary subscriber identification number that contains embedded address information for the processing element. The present invention comprises a processing element unit controller and associated computer software within the mobile switching center that is capable of embedding appropriate address information for a processing element within a temporary subscriber identification number.

Subscriber records and application software programs may also be located within the processing elements. This avoids having to send message traffic over the mobile telecommunications network requesting such information. It also avoids the use of a centralized database server. In one advantageous embodiment of the invention, the processing element unit is a visitor location register.

It is an object of the present invention to provide an apparatus and method for providing a distributed processing element unit in a mobile telecommunications network.

It is another object of the present invention to provide a processing element unit controller in a mobile telecommunications network that is capable of embedding in a temporary identification number information that identifies the location of a processing element within a processing element unit.

It is yet another object of the present invention to provide a processing element unit controller in a mobile telecommunications network that is capable of embedding in a temporary identification number information that identifies the location of a processing element within a processing element unit by adding an address offset pointer to point to a particular processing element.

It is also an object of the present invention to provide a processing element unit controller in a mobile telecommunications network that is capable of locating subscriber records in a processing element unit.

It is still another object of the present invention to provide a distributed processing element unit in a mobile telecommunications network that is capable of executing application software programs that are located within a processing element of the distributed processing element unit that contain subscriber records.

It is an object of the present invention to provide an apparatus and method for providing a distributed visitor location register in a mobile telecommunications network.

It is another object of the present invention to provide a visitor location register controller in a mobile telecommunications network that is capable of embedding in a temporary identification number information that identifies the location of a visitor location register site within a visitor location register.

It is yet another object of the present invention to provide a visitor location register controller in a mobile telecommunications network that is capable of embedding in a temporary identification number information that identifies the location of a visitor location register site within a visitor location register by adding an address offset pointer to point to a particular visitor location register site.

It is also an object of the present invention to provide a visitor location register controller in a mobile telecommunications network that is capable of locating subscriber records in a visitor location register.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. The principles of the present invention will be illustrated using a wireless telecommunications network. However, those skilled in the art will understand that the principles of the present invention may be implemented in any suitably arranged telecommunications network.

Figure 1:
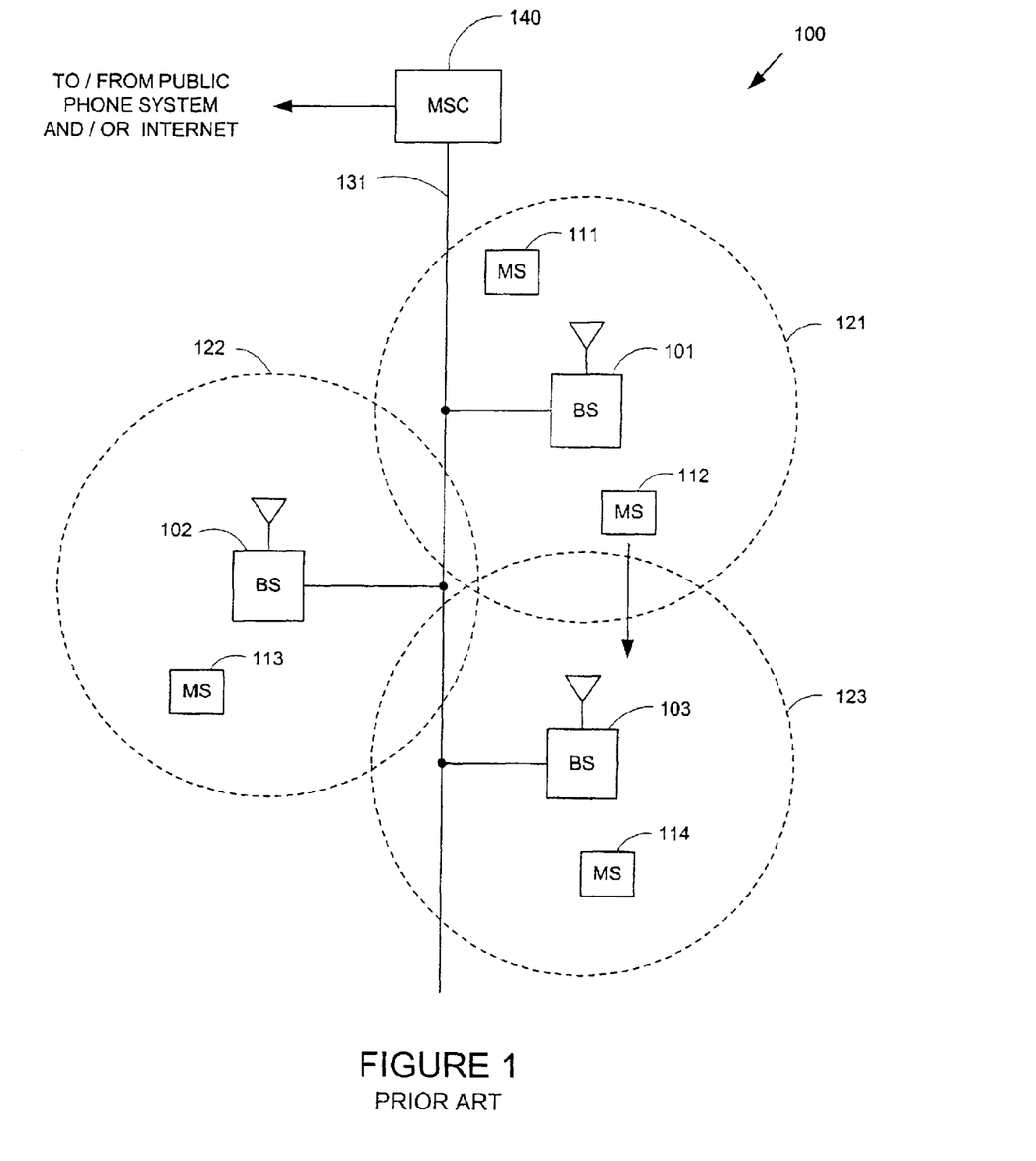
FIG. 1 illustrates an exemplary prior art wireless network.

FIG. 1 illustrates a general overview of an exemplary wireless network 100. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handsets, portable computers, telemetry devices, and the like, which are capable of communicating with the base stations via wireless links.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

Each of the base stations BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, a handoff transfers control of a call from a first cell to a second cell. For example, if MS 112 is in communication with BS 101 and senses that the signal from BS 101 is becoming unacceptably weak, MS 112 may then switch to a base station that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of the wireless devices in wireless network 100 may be capable of executing real time applications, such as streaming audio or streaming video applications. Wireless network 100 receives the real time data from, for example, the Internet and transmits it in the forward channel to the wireless device. For example, MS 112 may comprise a 3G cellular phone device that is capable of surfing the Internet and listening to streaming audio, such as music from the web site "www.mp3.com" or a sports radio broadcast from the web site "www.broadcast.com." MS 112 may also view streaming video from a news web site, such as "www.CNN.com." To avoid increasing the memory requirements and the size of wireless phone devices, one or more of the base stations in wireless network 100 provide real time data buffers that can be used to buffer real time data being sent to, for example, MS 112.

Figure 2:
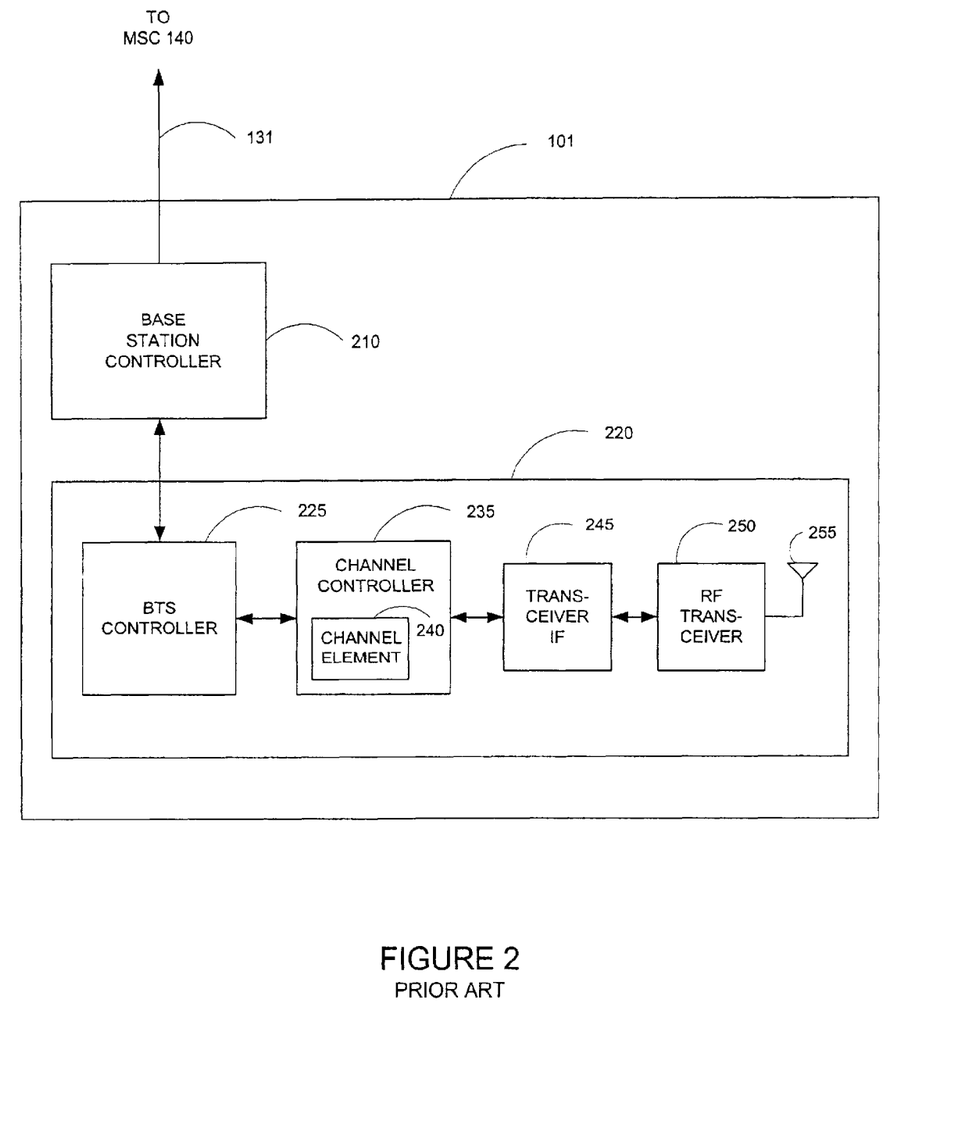
FIG. 2 illustrates an exemplary prior art base station of the exemplary prior art wireless network shown in FIG. 1.

FIG. 2 illustrates in greater detail exemplary base station 101. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235 with representative channel element 240, transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 235 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In one embodiment, antenna array 255 may comprise a multi-sector antenna, such as a three sector antenna in which each antenna sector is responsible for transmitting and receiving in a one hundred twenty degree (120°) arc of coverage area. Additionally, RF transceiver 250 may contain an antenna selection unit to select among different antennas in antenna array 255 during both transmit and receive operations.

For the purpose of illustration, assume that a user of mobile station 111 wishes to make a call to another mobile station that is not part of the home access provider network of mobile station 111. The call could be a voice call from a cellular telephone or a data call from a wireless device capable of transmitting and receiving data packets. The call from mobile station 111 must be routed to the home access provider network of the mobile station to be called.

Figure 3:
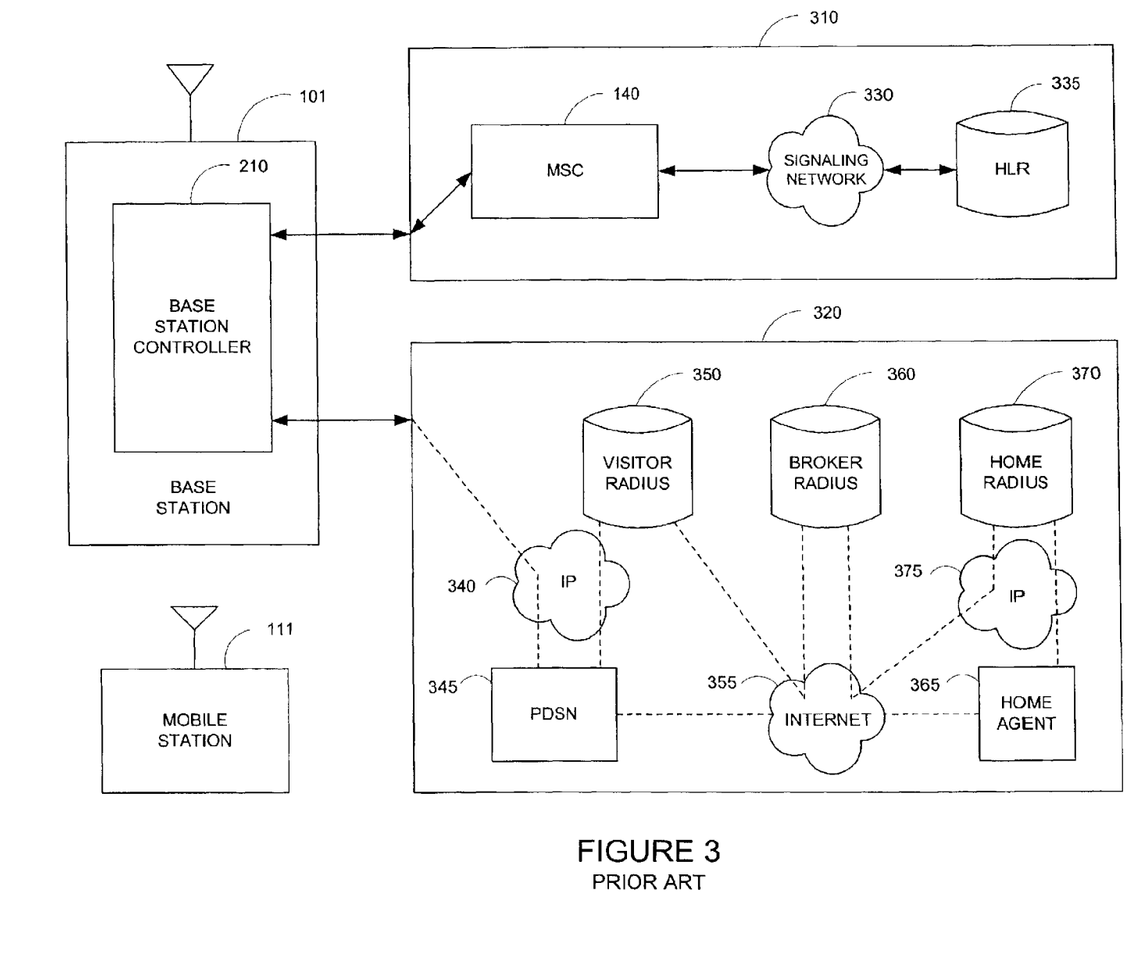
FIG. 3 illustrates a base station controller in a base station coupled to a prior art voice network and coupled to a prior art Internet protocol (IP) network.

FIG. 3 illustrates a base station controller 210 in a base station 101 coupled to a prior art voice network 310 and coupled to a prior art Internet protocol (IP) network 320. Mobile station 111 makes a call by first sending the call to base station 101.

If the call from mobile station 111 is a voice call, then base station controller 210 within base station 101 routes the call to voice network 310. The voice call goes to mobile switching center (MSC) 140 for registration. Mobile switching center (MSC) 140 is coupled to a visitor location register (VLR) (not shown in FIG. 3). The voice call is routed through signaling network 330 to a home location register (HLR) 335.

If the call from mobile station 111 is data call, then base station controller 210 within base station 101 routes the call to IP (Internet Protocol) network 320. The data call goes to IP network 340 and then to a packet data service node 345. Packet data service node 345 is denoted PDSN in FIG. 3. The call is routed through Internet 355 to IP network 375 and home agent 365. Visitor radius database 350 is coupled to PDSN 345 and Internet 355. Broker radius database 360 is coupled to Internet 355. Home radius database 370 is coupled to IP network 375 and home agent 365.

Figure 4:
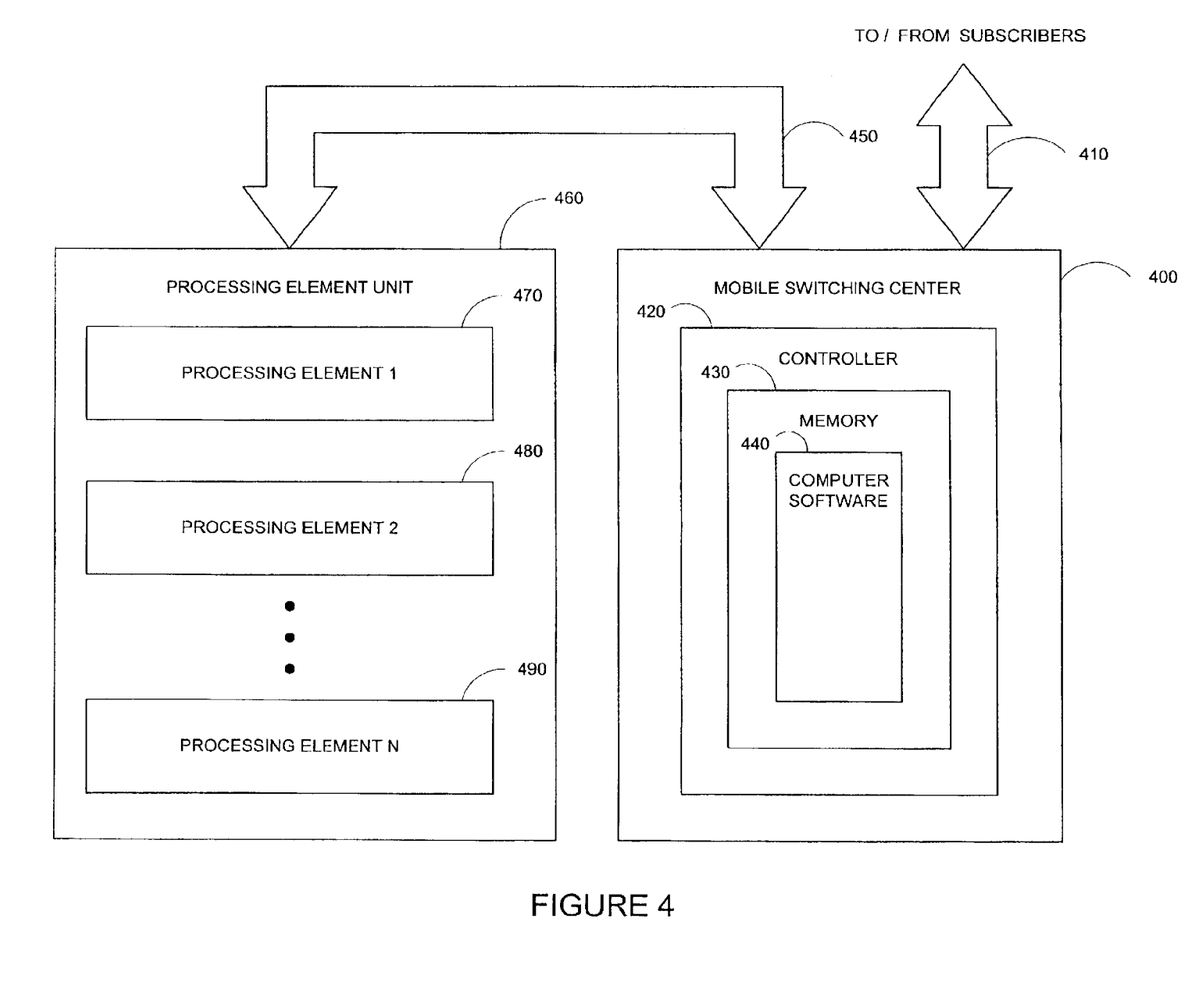
FIG. 4 illustrates a mobile switching center and a plurality of processing elements in accordance with the principles of the present invention.

FIG. 4 illustrates a mobile switching center (MSC) 400 of the present invention coupled to a plurality of subscribers (not shown in FIG. 4) and coupled to processing element unit 460. As will be more fully described, MSC 400 is capable of receiving workload messages from the subscribers through data line 410 and routing the workload messages through data line 450 to an appropriate processing element (470, 480, . . . , 490) within processing element unit 460. MSC 400 comprises controller 420, memory 430 and computer software 440.

Figure 5:
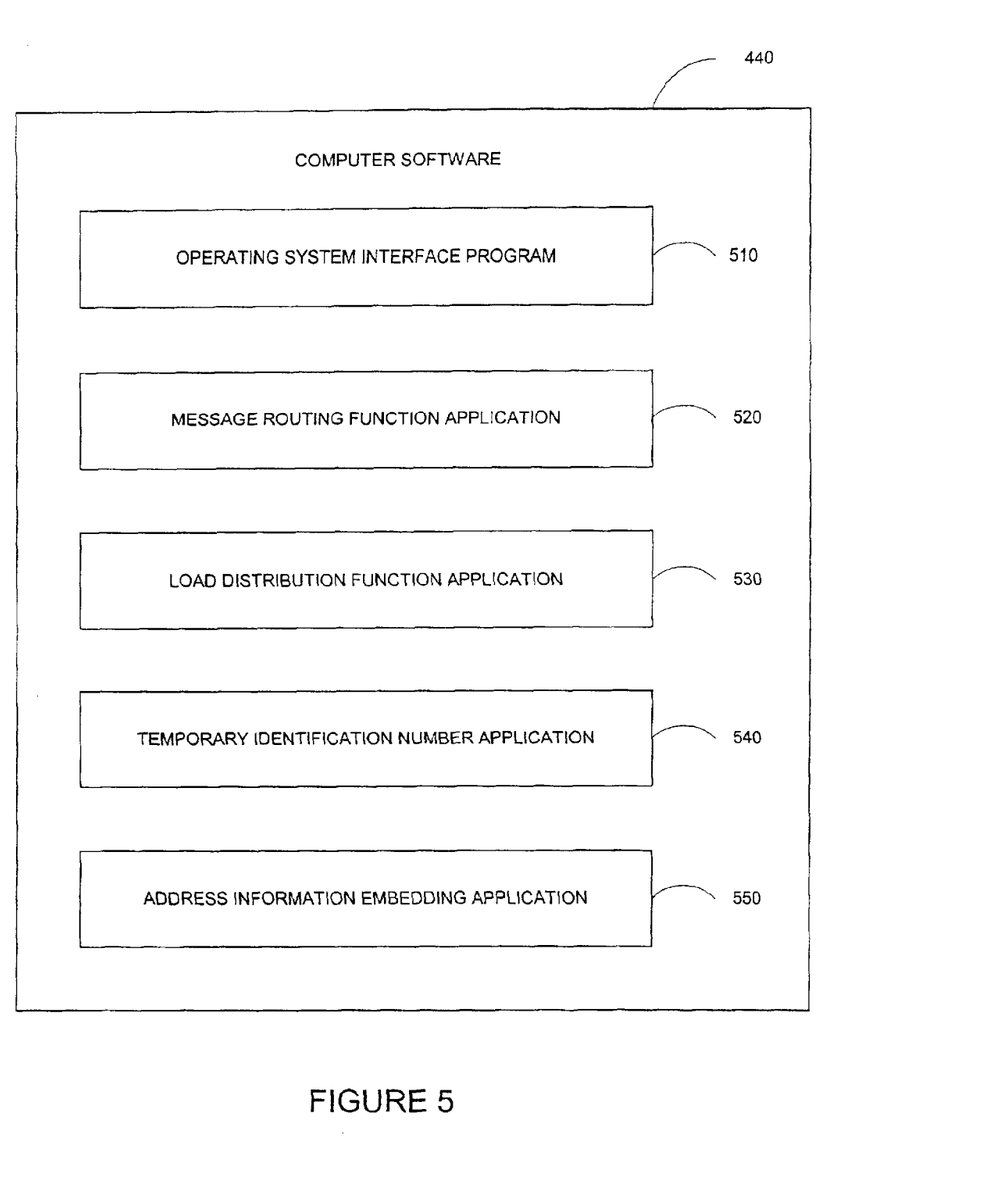
FIG. 5 illustrates computer software applications used by a mobile switching center of the present invention.

FIG. 5 illustrates computer software 440 of the present invention within MSC 400. Controller 420 and computer software 440 comprise a processing element unit controller that is capable of carrying out the functions of the present invention. Computer software 440 comprises an operating system interface program 510 that is capable of coordinating the operation of the various applications of computer software 440 with the operation of controller 420. Computer software 440 comprises message routing function application 520, load distribution function application 530, temporary number identification application 540, and address information embedding application 550. The function and operation of these computer software applications will be more fully described.

In a mobile communications network, the workload for MSC 400 is generated by the activities of subscribers such as the mobile stations (111, 112, 113, 114) and by other network elements (e.g., Home Location Register 335). The workload for MSC 400 takes the form of workload messages that arrive at MSC 400 in the form of signaling messages. The signaling messages contain subscriber identity information to associate the activity with a particular subscriber.

In a Third Generation (3G) wireless network, the identity information of a subscriber is either an International Mobile Station Identification (IMSI) number or a Temporary Mobile Station Identification (TMSI) number. For data related activity, a packet based Temporary Mobile Station Identification (P-TMSI) number is used. TMSI and P-TMSI are numbers that are assigned to a mobile station by MSC 400. The comments set forth below regarding the TMSI numbers also relate to the P-TMSI numbers.

Prior art methods require the processing elements to request and send subscriber records between the various processing elements as the subscriber records are needed. In order to avoid this process, MSC 400 of the present invention stores the subscriber records within the processing elements. As will be shown, the present invention enables MSC 400 to efficiently distribute subscriber records to the appropriate processing elements (470, 480, . . . , 490) by taking advantage of the flexibility that MSC 400 has over the process of assigning a TMSI number (and a P-TMSI number) to a mobile station.

After MSC 400 has stored a particular subscriber record within a particular processing element, MSC 400 must be capable of quickly and efficiently determining the location of the processing element that contains that particular subscriber record when a workload message arrives that relates to that particular subscriber record. That is, MSC 400 must be able to locate the processing element that the workload message is to be routed to.

MSC 400 of the present invention embeds within the temporary mobile station identification numbers, TMSI and P-TMSI, the necessary location information to send the workload messages to the appropriate processing element. This approach allows MSC 400 to route the workload messages to the appropriate processing element quickly and efficiently.

In its operation MSC 400 receives a workload message from a mobile station or from a network element. For convenience, we will collectively refer to mobile stations and network elements as subscribers. MSC 400 runs message routing function application 520 to cause a message routing function to examine the workload message. If the workload message is from a previously processed subscriber, then MSC 400 is aware of the location of the correct processing element for the workload message. The message routing function then delivers the workload message to the processing element where the subscriber record is located. Then MSC 400 processes the next workload message.

If the workload message is not from a previously processed subscriber, then MSC 400 causes the message routing function to extract the mobile identification information from the workload message and decide which processing element is to receive the workload message. If the subscriber is new to MSC 400, then MSC 400 runs load distribution function application 530 to cause a load distribution function to assign the new subscriber to the processing element.

MSC 400 then runs temporary identification number application 540 to assign a TMSI number (or a P-TMSI number) to the subscriber. MSC 400 then runs address information embedding application 550 to embed the necessary address information of the processing element into the TMSI number (or into the P-TMSI number). In one advantageous embodiment of the present invention, address information embedding application 550 adds to the TMSI number (or to the P-TMSI number) a number that represents an address that points to a particular processing element. Other methods for embedding address information into a TMSI number (or into a P-TMSI number) may also be designed. The message routing function then delivers the workload message to the processing element where the subscriber record is located.

When subsequent workload messages arrive from the subscriber, the message routing function examines the identification information within the TMSI number (or within the P-TMSI number). Because the address information of the processing element that has the subscriber record is embedded within the TMSI number (or the P-TMSI number), the message routing function is able to deliver the subsequent workload messages to the appropriate processing element very quickly and efficiently.

The processing element that contains the subscriber record may also contain application software to process the workload messages as they arrive within the processing element. In the present invention, there is no need for a processing element to send out messages to the other processing elements to request them to send the relevant subscriber record. The present invention provides a great saving in that it eliminates excessive message traffic between the processing elements. Also, because the subscriber record and the application software reside on the same processing element, access to the subscriber record is very fast and efficient. This feature improves the real-time performance of the application software. The present invention also reduces costs by eliminating the need for a centralized database server.

Figure 6:
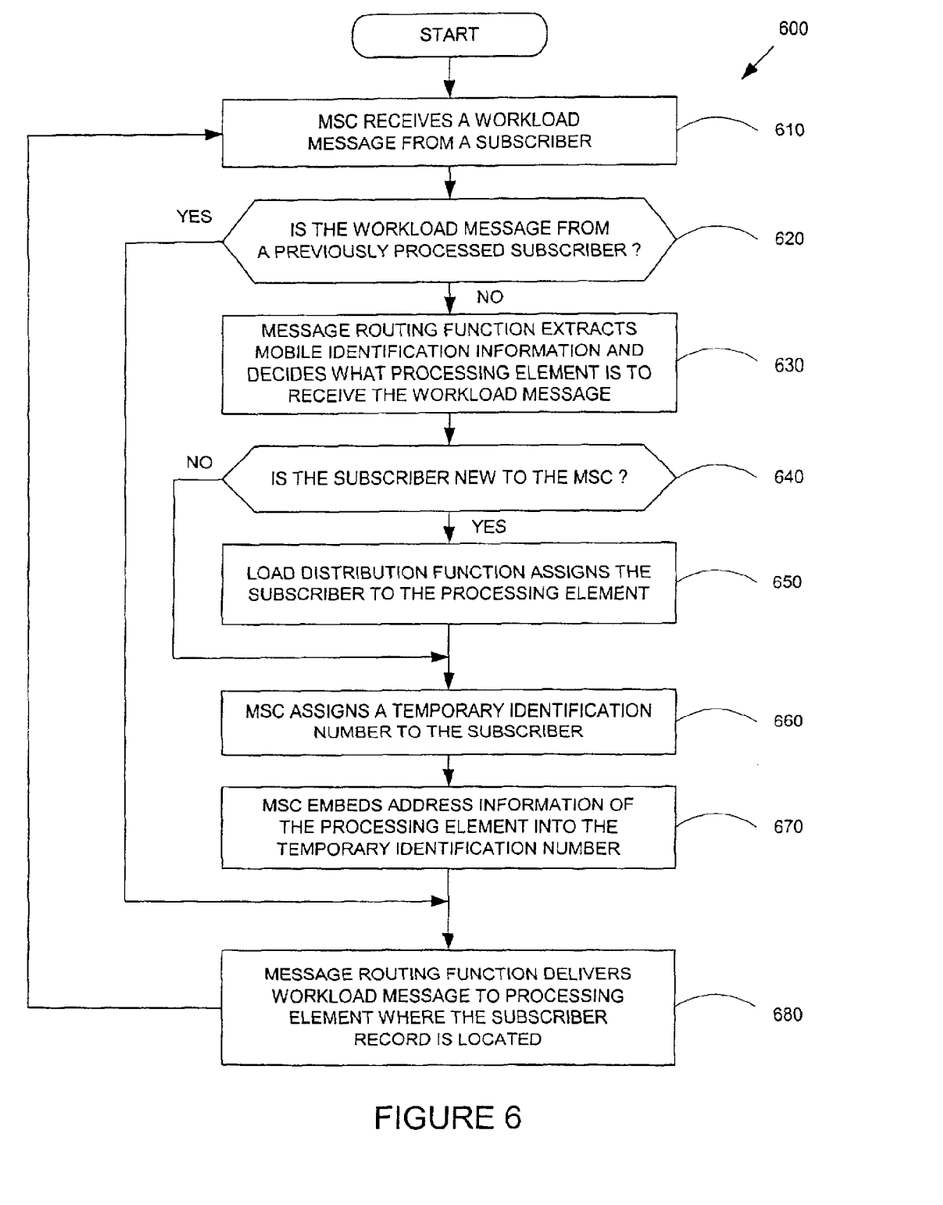
FIG. 6 is a flow chart illustrating the operation of an advantageous embodiment of a method of the present invention.

FIG. 6 illustrates a flow chart of the steps of one advantageous embodiment of the method of operation of the present invention. The steps of the method are generally denoted with the reference numeral 600. MSC 400 receives a workload message from a subscriber (step 610). MSC 400 then determines whether the workload message is from a previously processed subscriber (decision step 620). If the workload message is from a previously processed subscriber, message routing function delivers the workload message to the processing element where the subscriber record is located (step 680). Control then returns to step 610 where MSC 400 receives the next workload message.

If the workload message is not from a previously processed subscriber, message routing function extracts mobile identification information from the workload message and determines what processing element is to receive the workload message (step 630). MSC 400 then determines whether the subscriber is new to MSC 400 (decision step 640). If the subscriber is new to MSC 400, load distribution function assigns the subscriber to the processing element (step 650). MSC 400 then assigns a temporary identification number (e.g., TMSI, P-TMSI) to the subscriber (step 660). If the subscriber is not new to MSC 400, it is not necessary to perform step 650. MSC 400 then proceeds directly to step 660.

After a temporary identification number has been assigned to the subscriber in step 660, MSC 400 embeds address information of the processing element into the temporary identification number (step 670). Then the message routing function delivers the workload message to the processing element where the subscriber record is located (step 680). Control then returns to step 610 where MSC 400 receives the next workload message and the process continues.

Figure 7:
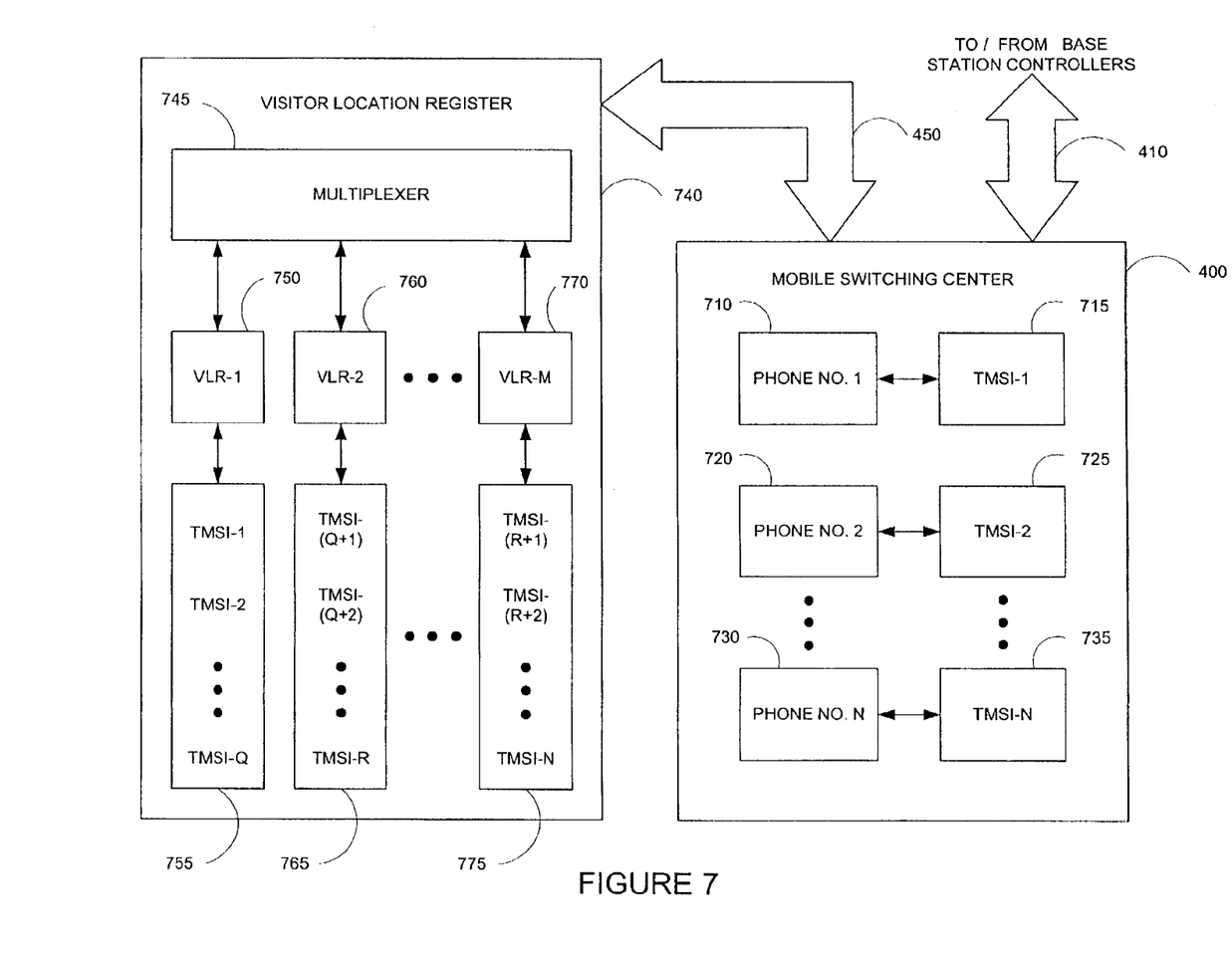
FIG. 7 illustrates a mobile switching center and a distributed visitor location register in accordance with the principles of the present invention.

FIG. 7 illustrates one advantageous embodiment of the present invention in which the processing elements comprise visitor location register (VLR) sites in a visitor location register 740. Traditionally, a visitor location register (VLR) is organized as a single entity in a network. This architecture is adequate for most purposes. However, in a large metropolitan area like Chicago or Los Angeles there will be a large number of subscribers. As the number of subscribers continues to grow, the number of subscribers for the VLR may be one million (1,000,000) or more subscribers. With current technology there is a limit to the number of subscribers that a VLR can handle. For example, some types of VLR cannot handle more than about two hundred thousand (200,000) subscribers.

It is possible to create a VLR that has a larger capacity by using a plurality of smaller VLR units. This arrangement is shown in FIG. 7 where visitor location register (VLR) 740 comprises a first VLR unit VLR-1 750, a second VLR unit VLR-2 760, and an Mth VLR unit VLR-M 770. The VLR units (750, 760, . . . , 770) are coupled to a multiplexer 745 that directs messages to the VLR units from MSC 400 through data line 450.

In prior art systems the subscriber records within a VLR unit are distributed randomly. This is a problem because a prior art MSC does not know exactly where to find the subscriber records. If there were a single VLR database then MSC 400 would simply search the whole VLR database. When multiple VLR databases exist MSC 400 does not know which VLR database contains a particular subscriber record and must search all the VLR databases.

The present invention provides an apparatus and method for distributing and accessing the subscriber records in a VLR database using address information embedded in a temporary identification number. Controller 420 and computer software 440 within mobile switching center 400 (as shown in FIG. 4) comprise a visitor location register controller that is capable of carrying out the functions of the present invention.

As shown in FIG. 7, cellular telephone calls from a plurality of base station controllers (e.g., base station controller 210) are provided to MSC 400 through data line 410. As previously described, MSC 400 assigns a temporary identification number (e.g., TMSI) to each telephone number. MSC 400 assigns a first telephone number 710 with TMSI-1 715. MSC 400 assigns a second telephone number 720 with TMSI-2 725. MSC 400 continues the process and may assign the Nth telephone number 730 to TMSI-N 735. Also as previously described MSC 400 embeds address information of a processing element (here an address of a VLR site in one of the VLR units (750, 760, . . . , 770)) into the temporary identification number.

In the exemplary advantageous embodiment of the present invention shown in FIG. 7, a first portion 755 of the TMSI numbers are assigned to VLR-1 750. The first portion 755 of the TMSI numbers comprise numbers TMSI-1 through TMSI-Q where Q is an integer less than N. A second portion 765 of the TMSI numbers are assigned to VLR-2 760. The second portion 765 of the TMSI numbers comprises numbers TMSI-(Q+1) through TMSI-R where R is an integer greater than Q but less than N. The remaining TMSI numbers are successively placed within other VLR units. A final portion 775 of the TMSI numbers are assigned to VLR-M 770. The final portion 775 of the TMSI numbers comprises numbers TMSI-(R+1) through TMSI-N. It is understood that the size of each VLR unit may vary depending upon the values chosen for the integers Q, R, and N. It is also understood that a variable number (M) of VLR units may be used depending upon the operational requirements of VLR 740. As the number of subscribers within the VLR grows, addition VLR units may be added as necessary.

The address information for each VLR site within each VLR unit is embedded with the corresponding TMSI number. MSC 400 is therefore able to automatically access the proper VLR site within VLR 740 even though VLR 740 comprises a plurality of VLR units. For example, assume that MSC 400 receives a cellular telephone call from a first user and the call has a temporary identification number of TMSI-2. MSC 400 can immediately determine that TMSI-2 is within VLR-1 750 and can immediately access the TMSI-1 VLR site within VLR-1 750 from the address offset information embedded within TMSI-2. Similarly, assume that MSC 400 receives a cellular telephone call from a second user and the call has a temporary identification number of TMSI-(R+1). MSC 400 can immediately determine that TMSI-(R+1) is within VLR-M 770 and can immediately access the TMSI-(R+1) VLR site within VLR-M 770 from the address offset information embedded within TMSI-(R+1).

MSC 400 and VLR 740 of the present invention have many advantages over prior art VLR systems. The present invention eliminates the need for message traffic between the network elements to locate the subscriber records. In addition, the VLR units within VLR 740 may contain application software that can directly access and process subscriber record information. This feature improves the real time performance of the application software. MSC 400 is capable of delivering workload messages directly to the appropriate VLR site within a VLR unit where the desired subscriber record is located. MSC 400 and VLR 740 of the present invention also reduce costs by eliminating the need for a centralized database server.

Although the present invention has been described with reference to distributed visitor location register 740, the present invention is not limited to use in a visitor location register. Mobile switching center 400 may itself utilize a distributed architecture of the present invention. That is, mobile switching center 400 may itself comprise a plurality of processing elements that are organized and accessible in accordance with the principles of the present invention.

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations capable of communicating with a plurality of mobile stations in a coverage area of said wireless network, a mobile switching center capable of distributing messages to a plurality of visitor location register units, said mobile switching center comprising:
   a controller capable of receiving a first message associated with a first one of said plurality of mobile stations, embedding an address associated with a first one of said visitor location register units in a temporary identification number in said first message, and sending said first message to said first visitor location register unit.

2. The mobile switching center as set forth in claim 1, wherein said controller is further capable of assigning said first visitor location register unit to process messages associated with said first mobile station.

3. The mobile switching center as set forth in claim 2, wherein said controller assigns said first visitor location register unit to process messages associated with said first mobile station in order to perform load-sharing of messages across said plurality of visitor location register units.

4. The mobile switching center as set forth in claim 2, wherein said controller assigns said first visitor location register unit to process messages associated with said first mobile station when said first mobile station first accesses said wireless network.

5. The mobile switching center as set forth in claim 2, wherein said controller is further capable of assigning said temporary identification number to said first mobile station.

6. The mobile switching center as set forth in claim 5, wherein said temporary identification number comprises a Temporary Mobile Station Identification (TMSI) number.

7. The mobile switching center as set forth in claim 5, wherein said temporary identification number comprises an International Mobile Station Identification (IMSI) number.

8. A wireless network comprising:
   a plurality of base stations capable of communicating with a plurality of mobile stations in a coverage area of said wireless network;
   a plurality of visitor location register units; and
   a mobile switching center capable of distributing messages to said plurality of visitor location register units, said mobile switching center comprising:
      a controller capable of receiving a first message associated with a first one of said plurality of mobile stations, embedding an address associated with a first one of said visitor location register units in a temporary identification number in said first message, and sending said first message to said first visitor location register unit.

9. The wireless network as set forth in claim 8, wherein said controller is further capable of assigning said first visitor location register unit to process messages associated with said first mobile station.

10. The wireless network as set forth in claim 9, wherein said controller assigns said first visitor location register unit to process messages associated with said first mobile station in order to perform load-sharing of messages across said plurality of visitor location register units.

11. The wireless network as set forth in claim 9, wherein said controller assigns said first visitor location register unit to process messages associated with said first mobile station when said first mobile station first accesses said wireless network.

12. The wireless network as set forth in claim 9, wherein said controller is further capable of assigning said temporary identification number to said first mobile station.

13. The wireless network as set forth in claim 12, wherein said temporary identification number comprises a Temporary Mobile Station Identification (TMSI) number.

14. The wireless network as set forth in claim 13, wherein said temporary identification number comprises an International Mobile Station Identification (IMSI) number.

15. For use in a mobile switching center of a wireless network comprising a plurality of base stations capable of communicating with a plurality of mobile stations in a coverage area of the wireless network, a method of distributing messages to a plurality of visitor location register units comprising the steps of:
   receiving in the mobile switching center a first message associated with a first one of the plurality of mobile stations;
   embedding an address associated with a first one of the visitor location register units in a temporary identification number in the first message; and
   sending the first message to the first visitor location register unit.

16. The method as set forth in claim 15, further comprising the step of assigning the first visitor location register unit to process messages associated with the first mobile station.

17. The method as set forth in claim 16, wherein the step of assigning assigns the first visitor location register unit to process messages associated with the first mobile station in order to perform load-sharing of messages across said plurality of visitor location register units.

18. The method as set forth in claim 16, wherein the step of assigning assigns the first visitor location register unit to process messages associated with the first mobile station when the first mobile station first accesses the wireless network.

19. The method as set forth in claim 16, further comprising the step of assigning the temporary identification number to the first mobile station.

20. The method as set forth in claim 19, wherein the temporary identification number comprises a Temporary Mobile Station Identification (TMSI) number.

21. The method as set forth in claim 19, wherein the temporary identification number comprises an International Mobile Station Identification (IMSI) number.

* * * * *